US012762606B2

(12) United States Patent
Cockcroft

(10) Patent No.: US 12,762,606 B2
(45) **Date of Patent: *Oct. 13, 2026**

(54) REMOVING PURCHASES FROM ONLINE CONTAINERS

(71) Applicant: eBay Inc., San Jose, CA (US)

(72) Inventor: Oliver Nicholas Cockcroft, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/819,759

(22) Filed: Aug. 29, 2024

(65) Prior Publication Data

US 2024/0420220 A1 Dec. 19, 2024

Related U.S. Application Data

(63) Continuation of application No. 18/139,038, filed on Apr. 25, 2023, now Pat. No. 12,100,036, which is a
(Continued)

(51) Int. Cl.
*G06Q 30/06* (2023.01)
*G06Q 30/0601* (2023.01)

(52) U.S. Cl.
CPC ..... *G06Q 30/0633* (2013.01); *G06Q 30/0601* (2013.01)

(58) Field of Classification Search
CPC ....................... G06Q 30/0601; G06Q 30/0633
(Continued)

(56) References Cited

U.S. PATENT DOCUMENTS 6,999,941 B1 * 2/2006 Agarwal ............ G06Q 30/0625 705/26.81
8,612,312 B1 * 12/2013 Edwards ............ G06Q 30/0633 705/26.81

(Continued)

FOREIGN PATENT DOCUMENTS

KR 20060049936 A * 5/2006 .............. H04W 4/00

OTHER PUBLICATIONS

Article, "System and Method for "Wish List" Actualization and Use", IP. Com Publication date Jul. 24, 2003, publishing venue IBM, The IP. Com journal; retrieved from IP. Com on Feb. 27, 2026 (Year: 2003).*

(Continued)

*Primary Examiner* — Yogesh C Garg
(74) *Attorney, Agent, or Firm* — FIG. 1 Patents

(57) ABSTRACT

Systems and methods are provided for identifying a first user account based on an indication of purchase of a first item; identifying a second user account associated with the first user account; determining a shared characteristic between the first item of the first user account and a second item in an online container associated with the second user account; determining a user interest of the second item based on user attribute data associated with the second user account and the shared characteristic; removing the second item from the online container based on the determining of the user interest; and causing display of a notification on a user interface of a device associated with the second user account, the notification including an indication of the second item being removed from the online container based on the indication of purchase of the first item.

20 Claims, 5 Drawing Sheets

Related U.S. Application Data continuation of application No. 17/357,292, filed on Jun. 24, 2021, now Pat. No. 11,669,885, which is a continuation of application No. 16/407,621, filed on May 9, 2019, now Pat. No. 11,074,638, which is a continuation of application No. 14/191,798, filed on Feb. 27, 2014, now Pat. No. 10,373,233.

(58) Field of Classification Search
USPC ................................................ 705/26.1, 26.8
See application file for complete search history.

(56) References Cited

U.S. PATENT DOCUMENTS

| | | | | |
|---|---|---|---|---|
| 2009/0144161 | A1* | 6/2009 | Fisher .................. | G06Q 20/202 705/16 |
| 2009/0216549 | A1* | 8/2009 | Causey ............. | G06Q 30/0601 705/26.1 |

OTHER PUBLICATIONS

Article, "Web Commerce Counteroffer & Business Analytics System" published Sep. 16, 2013 IP.Com Journal , IP.Com Pad; retrieved from IP.Com on Jul. 5, 2026 (Year: 2013).*
"U.S. Appl. No. 18/139,038, Corrected Notice of Allowability mailed Jun. 6, 2024", 4 pgs.
"U.S. Appl. No. 18/139,038, Non Final Office Action mailed Jan. 25, 2024", 11 pgs.
"U.S. Appl. No. 18/139,038, Notice of Allowance mailed May 22, 2024", 11 pgs.
"Triggering in-application currency transfer", Article, PayPal (PYPL) issued patent, News Bites US—NASDAQ [Melbourne], (Apr. 8, 2021), 4 pages.

* cited by examiner

REMOVING PURCHASES FROM ONLINE CONTAINERS

CROSS-REFERENCE TO RELATED APPLICATION

This application is a continuation of U.S. patent application Ser. No. 18/139,038, filed Apr. 25, 2023, which is a continuation of U.S. patent application Ser. No. 17/357,292, filed Jun. 24, 2021, which is a continuation of U.S. patent application Ser. No. 16/407,621, filed on May 9, 2019, which is a continuation of U.S. patent application Ser. No. 14/191,798, filed on Feb. 27, 2014, each of which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The present application relates generally to data processing and, more specifically, to removing a purchase from an online container.

BACKGROUND

A user of an eCommerce website who is interested in purchasing a product (e.g., a good or a service) available for sale on the eCommerce website may place the product in an online container at the eCommerce website. The eCommerce website may be associated with a store that has an online presence. The online container may, for example, be an online shopping cart, a wish list, a shopping list, or a registry. The user may, at a later time, purchase the product from a different store. Often, despite the user already having purchased the product, the operator of the eCommerce website may transmit communications to the user reminding the user of his interest in purchasing the product.

BRIEF DESCRIPTION OF DRAWINGS

Some embodiments are illustrated by way of example and not limitation in the figures of the accompanying drawings, in which.

DETAILED DESCRIPTION

Figure 1:
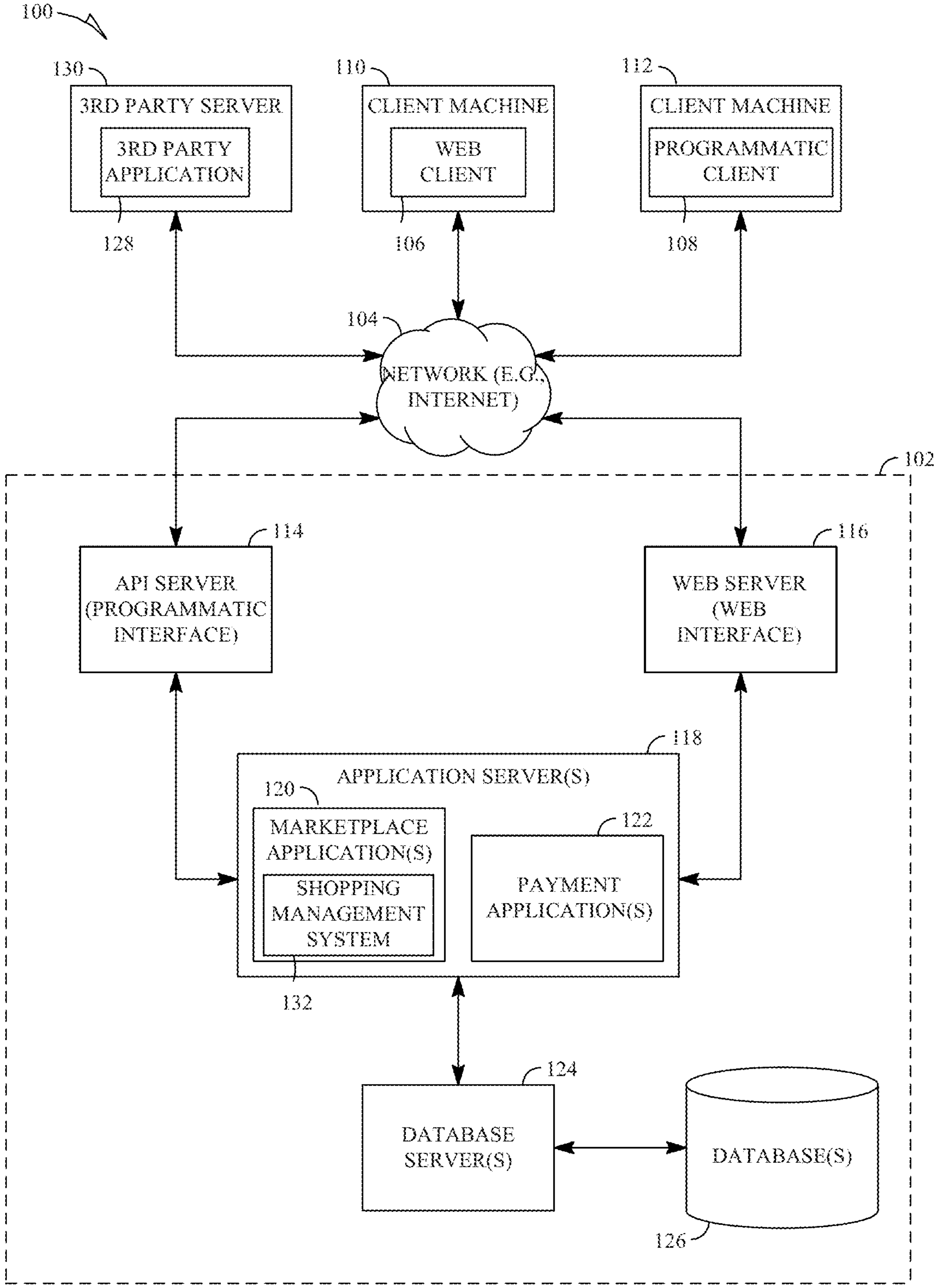
FIG. 1 is a network diagram depicting a client-server system, within which some example embodiments may be deployed.

Example methods and systems to remove purchases from online containers are described. In the following description, for purposes of explanation, numerous specific details are set forth in order to provide a thorough understanding of example embodiments. It will be evident, however, to one skilled in the art that the present invention may be practiced without these specific details.

Often, a user of an eCommerce website (or simply "website" or "online store") may visit the online store, browse products available for sale, and select a product for potential purchase. The online store may give the user the ability to create a user account associated with the user to facilitate the user's shopping at the online store. The data pertaining to the user account may be stored as one or more records in a database associated with the online store. The data pertaining to the user account may include data identifying the user (e.g., the user's first and last names, phone number, billing and shipping address(es), Social Security Number (SSN), whether the user a frequent buyer, whether the user is also a vendor or a seller, etc.), transaction data (e.g., the name of a purchased product, a product identifier, the date of transaction, the price, the condition of the product, etc.), user demographic data (e.g., age, gender, financial information, family status, employment status, etc.), purchase history data, return history data, product review data, etc.

When selecting the product for potential purchase at the online store, the user may "place" the desired product in (e.g., associate the product with) an online container included in the user account that is associated with the user and that pertains to the online store. The online container may, for example, be an online shopping cart, a wish list, a shopping list, a registry, etc. The online container may be associated with the user via a user account identifier ("user account ID") or a user identifier ("user ID"). The user may complete a shopping transaction soon after placing the desired product in the online container or at a later time. In some instances, when the user does not complete the transaction soon after placing the desire product in the online container, the operator of the online store may send reminders (e.g., email messages, text messages, etc.) to the user about the desired product being in the online container and requesting an action by the user based on determining the presence of the desired product in the online container. In some instances, the reminders may not be welcome by the user, especially when the user already purchased the desired product elsewhere. It may be beneficial to the operator of the online store, the user, or both, if the reference to the desired product purchased elsewhere is timely removed from the online container at the online store. Afterwards, the operator of the online store may transmit a communication to the user that includes information about additional products (e.g., products that are complementary to the purchased product, accessories, etc.) Such a communication may serve to inform the user and to provide an opportunity for the operator of the online store to transact with the user.

In some example embodiments, the online store is associated with (e.g., owned by, a subsidiary of, operated by, managed by, etc.) a merchant (e.g., a business or a human being). The merchant may, in some instances, also operate an offline store (also a "physical store"), such as a brick-and-mortar store, a market, or a market stall, in addition to operating the online store. For example, Best Buy Co., Inc. is a merchant that operates both physical stores and an online store under the "Best Buy®" brand. Some merchants do not operate any online stores and only operate one or more physical stores.

In some example embodiments, the user may visit the online store that pertains to a merchant, may browse the products the user is interested in at the online store, and may select one or more products to be placed in an online container associated with the user. The user may not purchase the product right away but may visit a physical store that pertains to the same merchant, for example, to see or inspect the actual item, to speak to a sales assistant, or to gather additional information about the product. While at the physical store, the user may purchase the product.

In other example embodiments, after placing the product in an online container associated with the user, at the online store that pertains to a first merchant, the user may visit a physical store that pertains to a second merchant where the user may purchase the product. In yet other example embodiments, after placing the product in an online container associated with the user, at a first online store that pertains to a first merchant, the user may visit a second online store that pertains to a second merchant where the user may purchase the product.

In various example embodiments, a shopping management system may determine that the user purchased a product in a first store (e.g., an online or a brick-and-mortar store), may identify one or more online containers associated with the user that include one or more desired products at one or more online stores, may match the purchased product to the one or more desired product based on a product characteristic common to the purchased product and the one or more desired products, and may remove the one or more desired products that match the already purchased product from the identified online containers. In some example embodiments, the shopping management system may determine, based on an online collection of the user, that the user already owns the product that appears in one or more online containers associated with the user that include the product at one or more online stores. The shopping management system may remove the already owned product from the online container(s) associated with the user at the one or more online stores.

According to various example embodiments, the shopping management system, based on one or more agreements with one or more merchants, informs the one or more merchants that the user purchased the product. This may allow the one or more merchants to offer additional products (e.g., accessories for the product) to the user, for example, in electronic communications addressed to the user or when the user is identified to be physically present in or near a brick-and-mortar store that pertains to the one or more merchants.

In some example embodiments, the shopping management system may receive an indication of a purchase of a first product at a first store. The shopping management system may identify a user based on the indication of the purchase. In some instances, additional user data that provides details about the user may also be used to identify the user. The shopping management system may determine, based on the identifying of the user and based on online container data that identifies an online container that pertains to a second store, that the user is associated with the online container. The shopping management system may also determine that a second product is included in the online container. The shopping management system may match the first product to the second product based on one or more similar product characteristics of the first product and the second product. Then, the shopping management system may remove the second product from the online container based on matching the first product to the second product.

According to some example embodiments, the matching of the first product and the second product (e.g., the desired product stored in the online container) includes determining that the first product and the second product are identical (e.g., the same brand and size television (TV) sets). In other example embodiments, the matching of the first product to the desired product includes determining that the first product and the desired product have a high degree of similarity based on one or more similar product characteristics or attributes. For example, the matching of the first product (e.g., a first TV set) and the desired product (e.g., a second TV set) may include comparing one or more characteristics of the first product and the desired products (e.g., the size of the two TV sets) and determining that the first product and the desired product have one or more identical characteristics, one or more similar characteristics, or a suitable combination thereof. Examples of a product characteristic may be a physical attribute of the product (e.g., size, dimension, color, quality, etc.), a category, a type, a price, or an identifier (e.g., a name, a brand, a title of a listing, a number, a SKU, etc.)

Consistent with certain example embodiments, before the shopping management system removes the desired product from the online container, the shopping management system determines, based on an action selection rule, whether the desired product is to be removed from the online container. In some example embodiments, a particular action selection rule may specify that a product may be removed from an online container if the price of the product is equal to or exceeds a monetary threshold value.

In determining whether to remove the desired product from the online container, the shopping management system applies the particular action selection rule to the product data that pertains to the desired product (e.g., the price of the desired product). For example, the shopping management system may compare the price of the desired product and the monetary threshold value specified in the particular action selection rule. If the price of the desired product is equal to or exceeds the monetary threshold value, the shopping management system removes the desired product from the online container.

In some example embodiments, an action selection rule may specify one or more other factors to be considered, in addition to or instead of the monetary threshold value, when determining whether the desired product is to be removed from the online container. An example of such factor is the category of the desired product. The monetary threshold value may be different for different categories of products. For example, the monetary threshold value may be higher for higher-priced products and lower for lower-priced products. In another example, for some categories of products (e.g., antiques, collectibles, etc.), there may not be a monetary threshold value to compare with the price of a particular product. In such a case, the shopping management system may determine, based on identifying the desired product as being categorized as an antique (or a collectible, etc.), that the desired product is not to be removed from the online container.

In some example embodiments, the determining whether to remove the desired product from the online container includes determining the type of products the first product and the desired product are. In some instances, the first product and the desired product may be large, expensive items such as TV sets or cars. Alternately or additionally, the first product and the desired product may be antiques or collectibles. In yet other instances, the first product and the desired product may be the same, relatively inexpensive product, for example, a particular item of clothing or a consumable good.

In some example embodiments, when the first product and the desired product are durable goods (e.g., large or expensive items) such as a large TV, a particular action selection rule may specify that the desired product may be removed from the online container based on an inference (or a likelihood) that the user may not want to purchase a second large TV present in the online container after the user already purchased a first large TV. The shopping management system may apply the particular action selection rule and determine that the second large TV is to be removed from the online container, and may remove the second large TV from the online container based on the determination. As a result, the operator of the online store may stop sending reminders to the user to purchase the desired product previously stored in the online container based on determining that the desired product is absent from the online container.

In certain example embodiments, when the first product and the desired product are durable goods, an additional action selection rule may specify that one or more attributes of the user are to be considered during the process of determining whether the desired product is to be removed from the online container. Examples of user attributes are demographic data (e.g., age or income), occupation, job title, user behavior (e.g., purchase history), hobbies, etc. that may be available to the shopping management system for the particular user. In some instances, based on user attribute data for the particular user, the shopping management system may determine that there is a high likelihood that the particular user may want to purchase the desired product (e.g., a durable good) included in the online container at a second store even though the particular user already purchased a first product of the same type or category from a first store. For example, based on the user's purchase history, the user's electronic marketplace collection information, or demographic data, or a suitable combination thereof, the shopping management system may determine that the user is a collector of antiques. The shopping management system may determine that the user is likely to purchase a second antique vase included in the online container at the second store despite already purchasing a first antique vase at the first store. Based on identifying the user's likely behavior with respect to the second antique vase in the online container, shopping management system may determine that the second antique vase is not to be removed from the online container associated with the user.

In some example embodiments, when the first product and the desired product are determined to be the same, relatively inexpensive product (e.g., a particular dress), a particular action selection rule may specify that the desired product may be removed from the online container based on an inference that the user may not want to purchase a second instance of the same product. The particular action selection rule may be based on results of consumer research that indicate that, for certain categories of products, consumers (e.g., users, buyers, purchasers, etc.) usually do not purchase more than one instance of the product (e.g., a dress in a particular size, a particular type of electronics item, etc.)

According to certain example embodiments, when the first product and the desired product are determined to be the same, relatively inexpensive product that is categorized as a consumable good (e.g., a food item, a cleaning supply item, etc.), a particular action selection rule may specify that the desired product may not be removed from the online container based on an inference that the user may buy the desired product repeatedly and may want to keep the desired product in the online container. In some instances, the shopping management system may confirm that the user purchased the particular desired product a plurality of times based on data pertaining to the user (e.g., transaction data, purchase history data, product review data, recommendation data, etc.)

FIG. 1 is a network diagram depicting a client-server system 100, within which various example embodiments may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser) and a programmatic client 108 executing on respective client machines (e.g., client devices) 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. In various example embodiments, the marketplace applications 120 may include a shopping management system 132. The shopping management system 132, in some example embodiments, may remove from an online container a product purchased elsewhere. The shopping management system 132 may be implemented in a computer system, in whole or in part, as described below with respect to FIG. 5. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, California) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
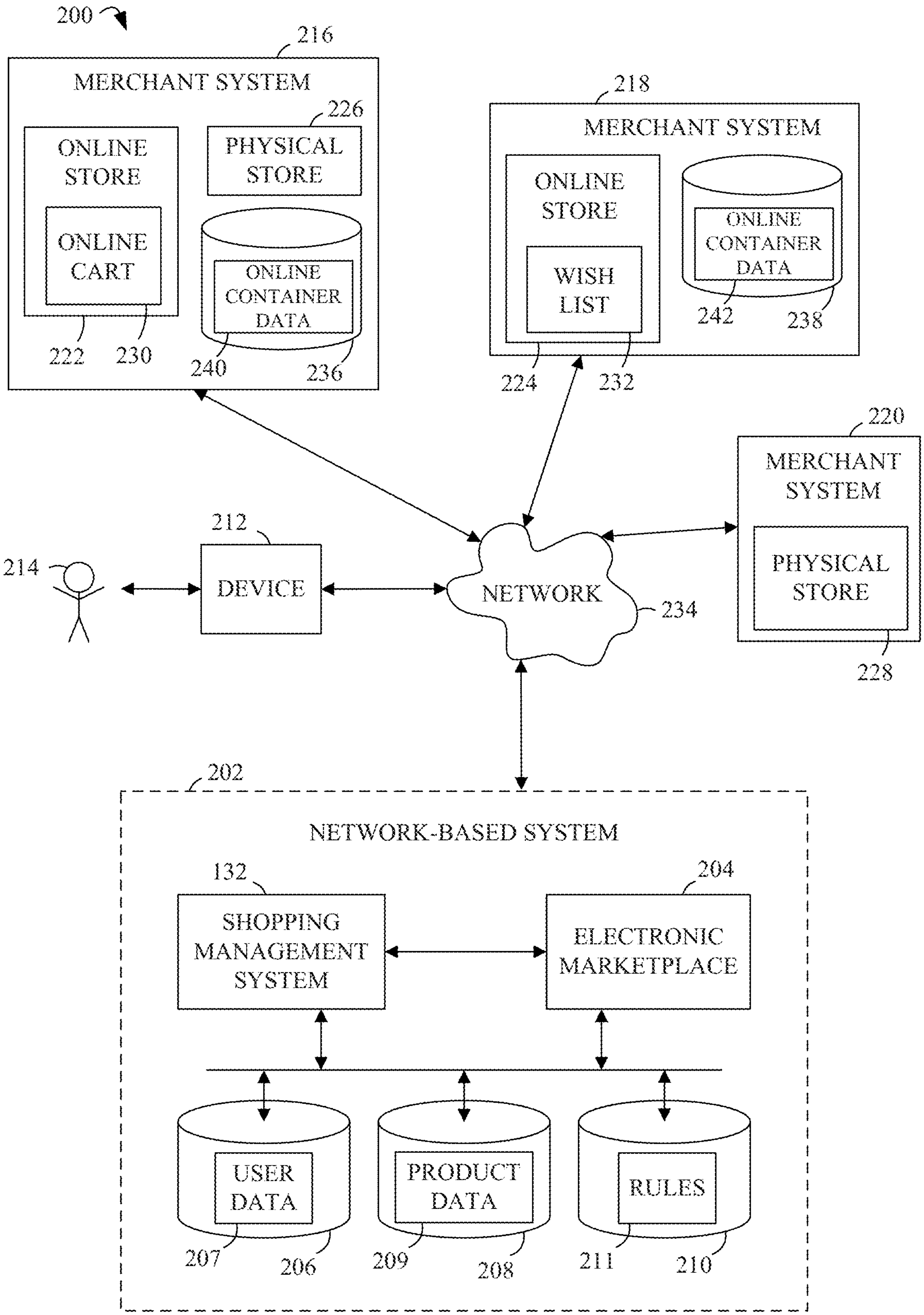
FIG. 2 is a network diagram illustrating a network environment suitable for removing purchases from online containers, according to some example embodiments.

FIG. 2 is a network diagram illustrating a network environment suitable for removing from an online container a product purchased elsewhere, according to some example embodiments. The network environment 200 includes the shopping management system 132, an electronic marketplace 204, databases 206, 208, and 210, merchant systems 216, 218, and 220, and a devices 212, all communicatively coupled to each other through a network 234. In some example embodiments, the databases 206, 208, and 210 may house records that store user data 207, product data 209, and rules 211 (e.g., action selection rules), respectively.

In some example embodiments, the product data 209 may include a catalogue of products. The products included in the catalogue may be available for sale on the electronic marketplace 204 or in a store external to the marketplace 204. The catalogue of products may comprise descriptions of the products. A description of a product may specify characteristics or attributes of the product. In certain example embodiments, a product name in the catalogue is associated with one or more product identifiers (e.g., a SKU, a model number, etc.) that may be used to identify a product in the inventory or payment systems of one or more stores.

As shown in FIG. 2, some or all of the shopping management system 132, the databases 206, 208, and 210, the electronic marketplace 204 may form all or part of a network-based system 202. In some example embodiments, the shopping management system 132, the databases 206, 208, or 210, or a suitable combination thereof may be part of the electronic marketplace 204.

The merchant system 216 includes an online store 222, a physical store 226, and a database 236. The physical store 226 may be a brick-and-mortar store, a market, a stall, a kiosk, etc. The operator of the physical store 226 may use a variety of payment systems or applications. Examples of such payment systems or applications may be PayPal Here™ or Square®. The database 236 may house records that store online container data 240 that identifies one or more online containers (e.g., an online cart 230, a wish list, a shopping list, a registry, etc.) that pertain to the online store 222. The one or more online containers may be associated with the user 214 (e.g., via one or more user identifiers). The online container data 240 may also include a user identifier (e.g., a user's name) associated with one or more online containers that pertain to the online store 222. Further, in some example embodiments, the database 236 may store transaction data that pertains to transactions (e.g., purchases of products by users) at the online store 222, the physical store 226, or both. Alternatively or additionally, the transaction data may be stored in a different database (e.g., in one or more databases that pertain to the electronic marketplace 204).

The merchant system 218 includes an online store 224 and a database 238. The database 238 may house records that store online container data 242 that identifies one or more online containers (e.g., a wish list 232) that pertain to the online store 224. The one or more online containers may be associated with the user 214 (e.g., via one or more user identifiers). The online container data 242 may also include a user identifier (e.g., a user's name) associated with one or more online containers that pertain to the online store 224. Further, in some example embodiments, the database 238 may store transaction data that pertains to transactions (e.g., purchases of products by users) at the online store 224. Alternatively or additionally, the transaction data may be stored in a different database (e.g., in one or more databases that pertain to the electronic marketplace 204).

The merchant system 220 includes a physical store 228. The physical store 228 may be a brick-and-mortar store, a market, a stall, a kiosk, etc. In some example embodiments, the physical store 228 is simply a stall or a kiosk operated by a human being, and may or may not be associated with the merchant system 220. The operator of the physical store 228 may use a variety of payment systems or applications. Examples of such payment systems or applications may be PayPal Here™ or Square®. In some example embodiments, the merchant system 220 includes one or more databases to house records that store transaction data that pertains to transactions (e.g., purchases of products by users) at the physical store 228. Alternatively or additionally, the transaction data may be stored in a different database (e.g., in one or more databases that pertain to the electronic marketplace 204).

The shopping management system 132, the databases 206, 208, 210, 236, and 238, the electronic marketplace 204, the merchant systems 216, 218, and 220, the online stores 222 and 224, the physical stores 226 and 228, and the device 212 may each be implemented in a computer system, in whole or in part, as described below with respect to FIG. 5. Some or all of the databases 206, 208, 210, 236, and 238 may be part of the one or more databases 126.

Also shown in FIG. 2 is user 214. The user 214 may be a human user (e.g., a human being), a machine user (e.g., a computer configured by a software program to interact with the device 212), or any suitable combination thereof (e.g., a human assisted by a machine or a machine supervised by a human). The user 214 is not part of the network environment 200, but is associated with the device 212 and may be the user of the device 212. For example, the device 212 may be a desktop computer, a vehicle computer, a tablet computer, a navigational device, a portable media device, a smart phone belonging to the user 214, or a wearable device worn by the user 214. The user 214, using the device 212, may connect to the merchant system 216 via the network 234 to browse products at the online store 222. The user 214 may select a product to purchase from one or more products available in the online store 222 and may place the product in the online cart 230. Similarly, the user 214, using the device 212, may connect to the merchant system 218 via the network 234 to browse products at the online store 224. The user 214 may select a product in which the user is interested from one or more products available in the online store 224 and may place the product in the wish list 232.

In some example embodiments, rather than purchasing the product placed in the online cart 230 at the online store 222 that pertains to merchant system 216, the user may purchase the product (e.g., an instance of the product) from the physical store 226 that pertains to the same merchant system 216. Alternatively or additionally, the user 214 may purchase the product from the physical store 228 that pertains to the merchant system 220 or from the online store of the merchant system 218.

In certain example embodiments, the shopping management system 132 receives an indication (e.g., from the merchant system 216, merchant system 218, or the merchant system 220) that the product was purchased at the physical store 226, the online store 224, or the physical store 228, respectively. Based on the indication of the purchase of the product and, in some instances, based on the user data 207, the shopping management system 132 identifies the user 214 as the user who purchased the instance of the product at the physical store 226, the online store 224, or the physical store 228. Based on identifying the user 214 and based on using the online container data 240 or 242 (or both), the shopping management system 132 determines that the user 214 is associated with the online cart 230 or the wish list 232 (or both). The shopping management system 132 also determines that the product is included in the online cart 230 or the wish list 232 (or both). The shopping management system 132 matches the product included in the online cart 230 or the wish list 232 (or both) and the instance of the product purchased from the physical store, 226, the online store 224, or the physical store 228 based on a product characteristic (e.g., stored as part of the product data 209) of the product. For example, the shopping management system 132 determines that the product that the user 222 added to the online cart 222 or to the wish list 232 (or both) is the same product as the instance of the product purchased at the physical store 226, online store 224, or the physical store 228 based on comparing the names and/or other attributes of the purchased product and the product added to the online cart 230 or wish list 232 (or both). Based on the matching, the shopping management system 132 may remove the product from the online cart 230 or wish list 232 (or both).

Any of the machines, databases, or devices shown in FIG. 2 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 2 may be combined into a single machine, and the functions described herein for any single machine, database, or device may be subdivided among multiple machines, databases, or devices.

The network 234 may be any network that enables communication between or among machines, databases, and devices (e.g., the shopping management system 132 may and the merchant system 216). Accordingly, the network 234 may be a wired network, a wireless network (e.g., a mobile or cellular network), or any suitable combination thereof. The network 234 may include one or more portions that constitute a private network, a public network (e.g., the Internet), or any suitable combination thereof.

Figure 3:
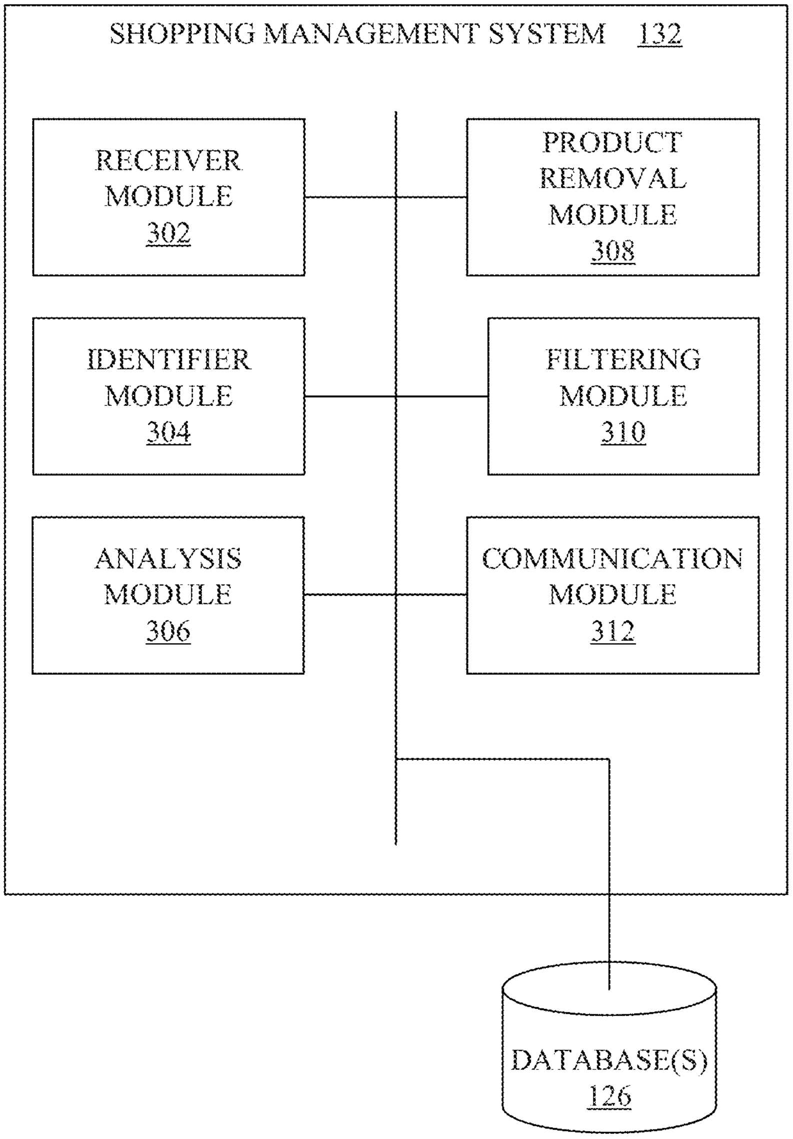
FIG. 3 is a block diagram of certain modules on an example shopping management system, consistent with some example embodiments.

FIG. 3 is a block diagram of certain modules on an example shopping management system, consistent with some example embodiments. The shopping management system 132 is shown to include a number of modules that may be in communication with each other. One or more modules of the shopping management system 132 may reside on a server, client, or other processing device. One or more modules of the shopping management system 132 may be implemented or executed using one or more hardware processors. In some example embodiments, one or more of the depicted modules are implemented on a server of the network-based system 102. In FIG. 3, the shopping management system 132 is shown as including a receiver module 302, an identifier module 304, an analysis module 306, a product removal module 308, a filtering module 310, and a communication module 312 configured to communicate with each other (e.g., via a bus, shared memory, or a switch). Also shown in FIG. 3 are the one or more databases 126 configured to communicate with one or more modules of the shopping management system 132.

According to some example embodiments, the receiver module 302 is configured to receive (or access) an indication of a purchase of a first product at a first store (e.g., the physical store 226). The purchase of the first product at the first store may be by the user 214. In some instances, the indication of the purchase is a communication transmitted to the shopping management system 132 by the merchant system 216 (e.g., a computer at the physical store 226). The receiver module 302 of the shopping management system may receive the indication of the purchase of the first product. The indication of the purchase of the first product may include transaction data that pertains to the particular purchase of the first product at the first store. In some example embodiments, the transaction data may include information such as a buyer identifier (ID) (e.g., a user ID, Social Security Number (SSN), a phone number, etc.), a seller identifier, a product identifier (e.g., a Stock Keeping Unit (SKU)), additional product details (e.g., product characteristics, features, type, quality, etc.), a price, transaction terms, or payment data (e.g., PayPal ID, debit card number, credit card number, store card or account number, loyalty card or account number, etc.), or a suitable combination thereof.

The identifier module 304 is configured to identify a user account associated with the user. In some example embodiments, the identification of the user account is based on the data included in the indication of the purchase of the first product at the first store. The user account may have one or more online containers for storing one or more desired products. The user account may or may not be associated with the first store where the user purchased the first product. The user account may be associated with a second store that offers one or more desired products for sale. According to some example embodiments, a user account is associated with more than one store. For example, a user account of the user 214 is associated with the online store 222 and the physical store 226. In another example, a user account of the user 214 is associated with the online store 22 and the online store 224. In yet another example, a user account of the user 214 is associated with the online store 222.

In some example embodiments, the second store is an online store (e.g., the online store 222 or the online store 224) and the online container includes (e.g., is) an online shopping cart (e.g., the online cart 230). In certain example embodiments, the online container includes a wish list (e.g., the wish list 232). In various example embodiments, the online container includes a shopping list. The online store may also provide other types of online containers to facilitate the user's shopping for products at the online store. Examples of other types of online containers that the user may use at the online store are a registry, a collection, a catalogue, or a board. The user 214 may be associated with one or more online containers at a particular online store.

According to certain example embodiments, the first store is a physical store (e.g., the physical store 226) that pertains to a merchant (e.g., the merchant system 216) and the second store is an online store (e.g., the online store 222) that pertains to the same merchant. In some example embodiments, the first store is a physical store (e.g., the physical store 226) that pertains to a first merchant (e.g., the merchant system 216) and the second store is an online store (e.g., the online store 224) that pertains to a second merchant (e.g., the merchant system 218). In various example embodiments, the first store is an online store (e.g., the online store 222) that pertains to a first merchant (e.g., the merchant system 216) and the second store is an online store (e.g., the online store 224) that pertains to a second merchant (e.g., the merchant system 218).

In some example embodiments, the identifier module 304 identifies the user account based on the transaction data that is included in the indication of the purchase of the first product at the first store. The transaction data may include a user identifier ("ID") that authenticates a particular user as the buyer of the first product at the first store. The user ID may, in some instances, be mapped by the identifier module 304 to one or more user accounts associated with the particular user.

In one example, the buyer of the first product at the first store may pay for the first product using a digital wallet payment system (e.g., PayPal™). In some instances, the digital payment system is maintained by the shopping management system 132 or the electronic marketplace 204. The digital wallet payment system may have a digital wallet account associated with the buyer (e.g., via a digital wallet ID). The transaction data generated when the buyer completes a transaction using the digital wallet system may include the digital wallet ID. In some instances, the digital wallet ID associated with the buyer may be mapped to a user account associated with the buyer. The user account may pertain to an online store and may comprise one or more online containers for storing one or more desired products.

According to certain example embodiments, some or all of the transaction data generated when using the digital wallet system may be stored in one or more records of the databases 126. The use by the user of the digital wallet payment system may allow the shopping management system 132 to access transaction data pertaining to the purchase of the first product (e.g., data that connects the owner of the digital wallet to the particular transaction and to the purchase of the first product at the first store) without accessing the transaction data at the first store. Consistent with various example embodiments, one or more operators of online or of physical stores who accept payment using the digital wallet system may allow the shopping management system 132 to access one or more computer systems (e.g., an inventory system, a payment system, a database, etc.) that pertains to the one or more stores to retrieve data (e.g., user data, product data, or transaction data).

In another example, the buyer of the first product at the first store may pay for the first product using a credit card or another payment card (e.g., a debit card number, a store card number, etc.). Upon completing the transaction, the first store (e.g., a software program on a computer at the first store) may transmit the buyer's name (and the credit card number) to the shopping management system 132 as part of the transaction data that is included in the indication of the purchase of the first item. The identifier module 304 of the shopping management system 132 may identify a user account associated with the user based on the transaction data, for example, by mapping the buyer's name or credit card number to a user account ID that identifies the user account.

In some example embodiments, the identifier module 304 identifies the user account based on the indication of the purchase of the first product at the first store (e.g., the transaction data that pertains to the purchase) and based on additional data (e.g., the user data 207). The user account associated with the user, in some instances, may not be identified based on the transaction data that pertains to the purchase. One such instance may be when the user pays cash for the purchase of the first product at the first store. Alternate or additional types of data may be used to facilitate the identifying of the user account associated with the user. Examples of such data are a loyalty card number, a SSN, a phone number, biometrics data, voice recognition data, facial recognition data, a Facebook ID, a Twitter ID, etc. This data may, in some instances, be provided to the shopping management system 132 as part of the indication of the purchase of the first product and a user utilizing the user data 207. For example, based on biometrics data, voice recognition data, or facial recognition data that pertains to the user 214 (e.g., captured while the user 214 shopped in the physical store 226), the identifier module 304 may identify the user 214 as the buyer of the first product in the first store (e.g., the physical store 226).

The analysis module 306 is configured to match the first product to one or more desired products stored in the online container based on one or more similar product characteristics of the first product and the one or more desired products. In some example embodiments, the analysis module 306 performs the matching in response to the receiver module 302 receiving the indication of the purchase of the first product at the first store.

The matching of the first product to one or more desired products stored in the online container may, in some instances, include comparing one or more similar characteristics of the first product and of the one or more desired products. According to some example embodiments, the comparing of the one or more characteristics of the first product and of the one or more desired products includes parsing the descriptions of the first product and of the one or more desired products, and comparing a portion of a description (e.g., a particular characteristic) of the first product and a portion of a description of the one or more desired products (e.g., a characteristic similar to the particular characteristic of the first product). Some or all of the characteristics of a product may be included in a description of the product, for example, present in a listing of the product displayed to the user 214 on a website of an online store. The description of the first product and the description of the one or more desired products may be stored in one or more records of the databases 126 (e.g., the product data 209 in the database 208 or the online container data 240 or 242 in the respective databases 236 or 238) and may be accessed by the analysis module 306.

In some example embodiments, the matching of the first product to the one or more desired products includes: accessing first product data and desired product data, the first product data describing the first product and the desired product data describing the one or more desired products; identifying, based on the first product data, a first product characteristic of the first product; identifying, based on the desired product data, a second product characteristic of the one or more desired products; comparing the first product characteristic and the second product characteristic; and determining that the first product characteristic and the second product characteristic are identical. An example of a product characteristic of the first product and a product characteristic of the one or more desired products being identical is a model number of a first smart phone already purchased coinciding with (e.g., being identical to, corresponding exactly to, etc.) the model number of one or more desired smart phones listed in one or more online accounts. Based on the determination that the first product characteristic and the second product characteristic are identical, the analysis module 306 may determine that the first product and the one or more desired products are instances of the same product.

In certain example embodiments, the matching of the first product to the one or more desired products includes: accessing first product data and desired product data, the first product data describing the first product and the desired product data describing the one or more desired products; identifying, based on the first product data, a first product characteristic-value pair of the first product; identifying, based on the desired product data, a second product characteristic-value pair of the one or more desired products; comparing the value that corresponds to the first product characteristic with the value that corresponds to the second product characteristic; and determining that the value corresponding to the first product characteristic and the value corresponding to the second product characteristic are within a pre-determined range of values. For example, with respect to TV dimensions, the “42-inch” value that corresponds to the first product characteristic of the first product (e.g., the “dimension” characteristic of a purchased TV) and the “39-inch” value that corresponds to the similar product characteristic of the one or more desired products (e.g., the “dimension” characteristic of the one or more TVs listed in the online container(s)) are included in a pre-determined range of values that correspond to the “dimension” characteristic. Based on the determination that the value corresponding to the first product characteristic and the value corresponding to the similar product characteristic, the analysis module 306 may determine that the first product and the one or more desired products are highly similar. Because, in some instances, products that have a high degree of similarity may not be purchased repeatedly by some buyers, the product removal module 308 (described below) may remove the one or more desired products that match the first product from the online container.

In certain example embodiments, the comparing of the one or more characteristics of the first product and the one or more desired products includes parsing the product data that pertains to the first product and the product data that pertains to the one or more desired products; identifying a stock keeping unit (SKU) of the first product based on the parsing of the product data that pertains to the first product and a SKU of the one or more desired products based on the parsing of the product data that pertains to the one or more desired products; and comparing the SKU of the first product and the SKU of the one or more desired products. In some instances, the SKU of the first product and the SKU of the one or more desired products are identical. The analysis module 306 may determine that the SKUs of the first product and of the one or more desired products are identical, and may determine that the first and one or more desired products are a match. In other instances, the SKU of the first product and the SKU of the one or more desired products are not identical. The analysis module 306 may determine, using product data 209 or any other data accessed at (or received from) the merchant system(s) associated with the respective store(s), that the SKU of the first product and the SKU of the one or more desired products correspond to the same product or to products that are highly similar (e.g., based on a number of similarities between the products). As a result, the analysis module 306 may determine that the first product and the one or more desired products are a match based on comparing the SKUs of the first product and the one or more desired products.

According to some example embodiments, the shopping management system 132 may request the user 214 to confirm that the purchased product and the desired product that appears in the online container are the same. For example, the user 214 may be asked by the shopping management system 132 whether the SKU of the first product and the SKU of the desired product match. The question to the user 214 may be asked on an online site or via an electronic communication (e.g., email, text messaging service, etc.)

In certain example embodiments, the matching of the first product and the one or more desired products includes determining that the first product and the one or more desired products have a degree of similarity that exceeds a similarity threshold value. The degree of similarity may be determined based on the number (or percentage) of attributes of the first product that can be matched to the one or more desired products that match. In various example embodiments, the one or more desired products that have been matched to the first product are ranked based on their degree of similarity to the first product. For example, a desired product that has more similar attributes with the first product may rank higher than a desired product that has fewer similar attributes with the first product.

The product removal module 308 is configured to remove the one or more desired products that match the first product from the online container. In some example embodiments, the product removal module 308 removes the one or more desired products from the online container based on a determination (e.g., by the filtering module 310, described below) that the one or more desired products is removable from the online container. According to some example embodiments, the product removal module 308 removes the one or more desired products from the online container based on a permission to remove the one or more desired products from the online container. The permission to remove one or more products from one or more online containers may be received from the user, from a merchant (e.g., the merchant system 216 or the merchant system 218) associated with (e.g., who owns, operates, or manages) a particular store, or both.

The filtering module 310 is configured to determine, based on an action selection rule, whether the one or more desired products are to be removed from the online container. In some example embodiments, the removing of the one or more desired products from the online container (e.g., by the product removal module 308), in addition to being based on the matching of the first product to the one or more desired products, is further based on the determination that the one or more desired products are to be removed from the online container. The action selection rule may be part of one or more action selection rules stored in one or more records of the databases 126 (e.g., the rules 211 in the database 210). The action selection rule, according to some example embodiments, specifies that the one or more desired products are to be removed from the online container based on the first product and the one or more desired products having a degree of similarity that exceeds a similarity threshold value. Some products may have a degree of similarity of 100%. Such products are identical and a match. Other products may have a degree of similarity that is less than 100% but higher than a particular threshold value (e.g., 90%). Such products may be considered sufficiently similar to be a match.

The communication module 312 is configured to transmit a communication to a merchant (e.g., the merchant system 216 or the merchant system 218) associated with the user account. The communication may include a notification of the purchase of the first product by the use. In some example embodiments, the product removal module 308 removes the one or more desired products from the online container based on a permission to remove the one or more desired products from the online container. The permission may be received from the merchant system, in some instances, in response to the communication transmitted by the communication module 312. In other instances, the merchant may give permission to remove one or more products from online containers in an agreement with the operator of the shopping management system 132 prior to the communication module 312 transmitting the communication.

The communication module 312 is also configured to transmit a communication to the user. The communication may notify the user of the removal of the one or more desired products from the online container. In some example embodiments, the communication may request the permission of the user to remove the one or more desired products from the online container. In other example embodiments, the communication module 312 transmits the communication to the user after the product removal module 308 removes the one or more desired products from the online container associated with the user.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 4:
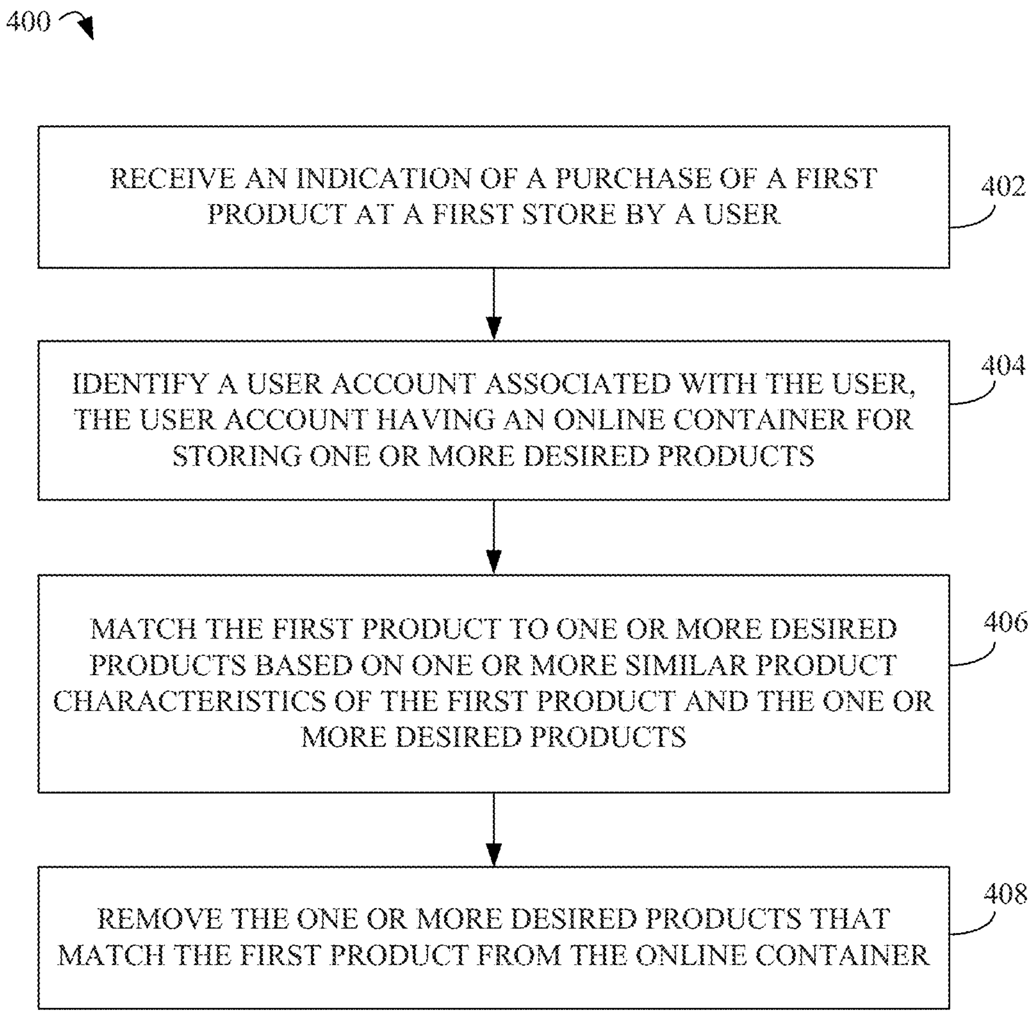
FIG. 4 is a flowchart illustrating an example method, according to various embodiments.

FIG. 4 is a flowchart illustrating an example method 400 of removing purchases from online containers, according to various embodiments. The described subject matter may be implemented for use with applications that utilize any of a variety of network or computing models, to include web-based applications, client-server applications, or even peer-to-peer applications. The operations in the method 400 may be performed by the shopping management system 132 using modules described above with respect to FIG. 3.

Consistent with some example embodiments, the method 400 begins at method operation 402, when an indication of a purchase of a first product at a first store is received. The purchase of the first product at the first store may be by a user (e.g., the user 214).

At method operation 404, a user account associated with the user is identified. The user account has one or more online container for storing one or more desired products. In some example embodiments, the user account is identified based on the indication of the purchase. For example, transaction data that pertains to the purchase of the first product at the first store by the user may be included in the indication of the purchase. In some example embodiments, different or additional data (e.g., user data 207) may serve as basis for identifying the user account associated with the user who purchased the first product. Identifying the user account, in some instances, may mean determining a unique alphanumeric combination (e.g., a user ID) that corresponds to a particular user and, based on the unique alphanumeric combination, identifying one or more user accounts associated with the user at one or more online stores that have one or more online containers for storing one or more desired products. In some example embodiments, the unique alphanumeric combination is maintained by the shopping management system 132. In certain example embodiments, the unique alphanumeric combination is received from a merchant system.

At method operation 406, the first product is matched to one or more desired products based on one or more product characteristics of the first product and the one or more desired products. For example, the shopping management system 132 may determine that the first product and the one or more desired products are instances of the same product based on one or more attributes of the product, such as the name of the product, the brand of the product, the dimensions of the product, or any suitable combination thereof. At method operation 408, the one or more desired products that match the first product are removed from the online container.

In some example embodiments, the shopping management system 132 further determines, based on an action selection rule, that the one or more desired products are to be removed from the online container. The determination may be made after the first product is matched to the one or more desired products and before the one or more desired products that match the first product are moved from the online container. The removing of the one or more desired products from the online container is further based on the determining that the one or more desired products are to be removed from the online container.

In some example embodiments, the shopping management system 132 further transmits a communication to a merchant system associated with the user account. The communication may include a notification of the purchase of the first product by the user. The removal of the one or more desired products from the online container may be based on a permission to remove the one or more desired products from the online container. The permission may be received from the merchant system.

According to some example embodiments, the shopping management system 132 further transmits a communication to the user. The communication may notify the user of the removal of the one or more desired products from the online container. In some example embodiments, the communication may request the user's permission to remove the one or more desired products from the online container. In various example embodiments, the removing of the one or more desired products from the online container is based on a permission by the user to remove the one or more desired products from the online container.

In various example embodiments, the matching of the first product to the one or more desired products includes comparing one or more characteristics of the first product and of the one or more desired products. The comparing of the one or more characteristics of the first product and of the one or more desired products, in certain example embodiments, includes comparing a portion of a description of the first product and a portion of a description of the one or more desired products. According to some example embodiments, the comparing of the one or more characteristics of the first product and of the one or more desired products includes comparing a stock keeping unit of the first product and a stock keeping unit of the one or more desired products. In certain example embodiments, the matching of the first product to the one or more desired products includes determining that the first product and the one or more desired products have a degree of similarity that exceeds a similarity threshold value.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
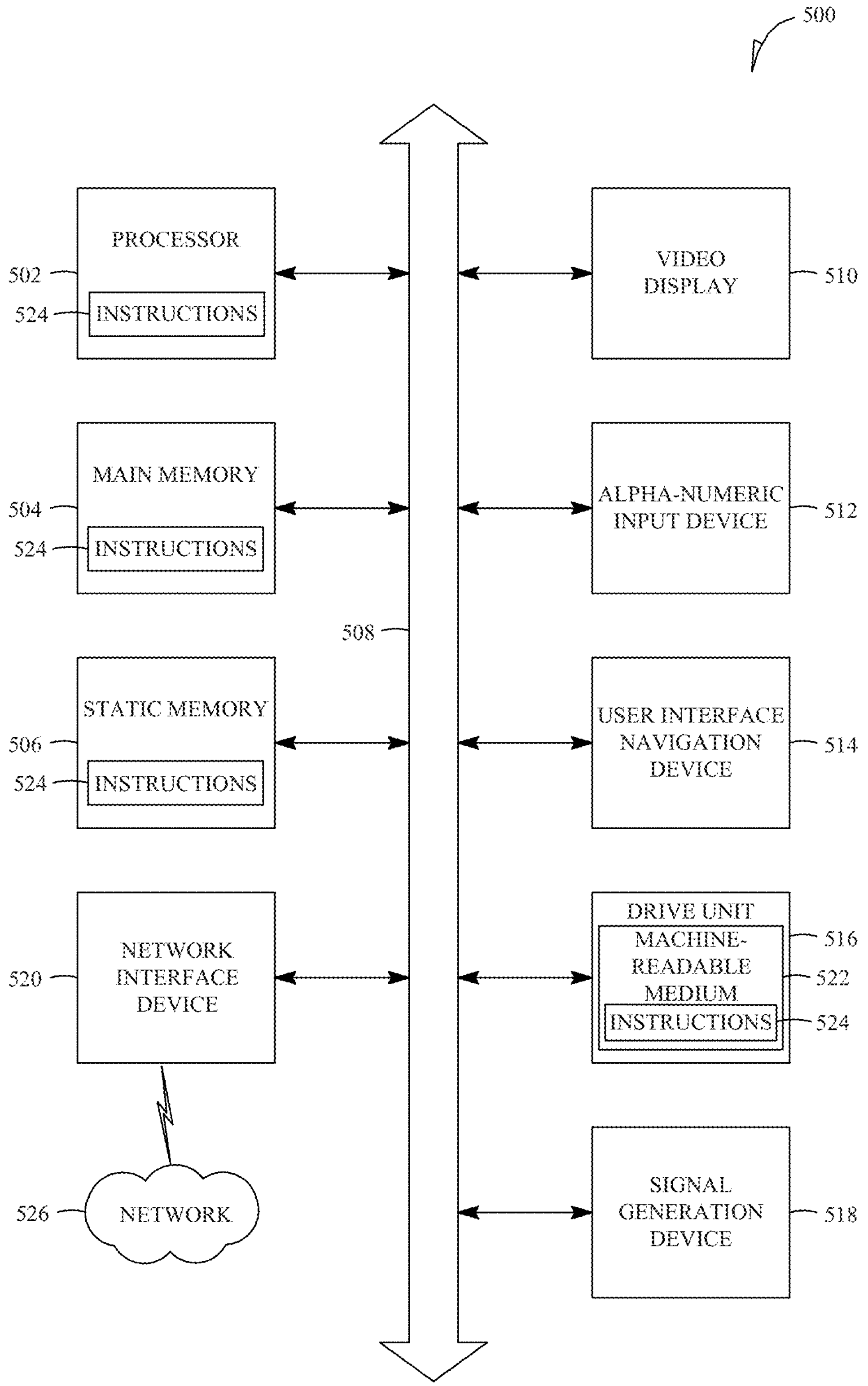
FIG. 5 is a diagrammatic representation of machine in the example form of a computer system within which a set of instructions may be executed for causing the machine to perform any one or more of the methodologies discussed herein.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:

one or more processors; and executable instructions accessible on a computer-readable medium that, when executed, cause the one or more processors to perform operations comprising:

identifying a first account based on an indication of purchase of a first item;

identifying a second account associated with the first account, the second account including an online container that includes a second item, the first item and the second item belonging to an item category;

determining that a purchase price of the second item exceeds a monetary threshold value configured for the item category;

in response to determining that the purchase price of the second item exceeds the monetary threshold value configured for the item category, removing the second item from the online container; and causing display of an indication of the second item being removed from the online container on a device associated with the second account.

2. The system of claim 1, wherein the first item is purchased from a brick-and-mortar store or a web-based online store associated with the first account.

3. The system of claim 1, wherein the item category is a first item category, and wherein the operations comprise:

detecting an indication of purchase of a third item; and identifying a fourth item in the online container, the fourth item and the third item belonging to a second item category.

4. The system of claim 3, wherein the operations comprise:

identifying an action selection rule associated with the second item category; and determining whether to remove the fourth item from the online container based on the action selection rule.

5. The system of claim 3, wherein the second item category is associated with collectible items, and wherein the second item category is not associated with a monetary threshold value configured for item removal.

6. The system of claim 3, wherein the operations comprise:

determining that the second item category is not associated with a monetary threshold value configured for item removal, the second item category being associated with collectible items;

receiving an indication from a third-party system confirming to remove the fourth item;

in response to receiving the indication from the third-party system confirming to remove the fourth item, removing the fourth item from the online container; and causing display of an indication of the fourth item being removed from the online container on the device associated with the second account.

7. The system of claim 1, wherein the operations comprise:

detecting an indication of purchase wherein the operations comprise of a fifth item; and identifying a sixth item in the online container, the sixth item and the fifth item belonging to a third item category.

8. The system of claim 7, wherein the operations comprise:

determining a user interest of the sixth item based on one or more shared characteristics between the fifth item and the sixth item; and determining that the sixth item is not to be removed from the online container based on the user interest.

9. The system of claim 8, wherein the operations comprise:

causing display of a selectable user interface element on the device, the selectable user interface element including an invitation to confirm the user interest in purchasing the sixth item.

10. The system of claim 8, wherein the user interest is determined further based on user attribute data indicating a user associated with the second account is a collector of items similar to the fifth item, and wherein the user attribute data comprises purchase history data, demographic data, occupational data, and behavioral data.

11. A method comprising:

identifying, by a computing device, a first account based on an indication of purchase of a first item;

identifying, by the computing device, a second account associated with the first account, the second account including an online container that includes a second item, the first item and the second item belonging to an item category;

determining, by the computing device, that a purchase price of the second item exceeds a monetary threshold value configured for the item category;

in response to determining that the purchase price of the second item exceeds the monetary threshold value configured for the item category, removing, by the computing device, the second item from the online container; and causing display, by the computing device, of an indication of the second item being removed from the online container on a device associated with the second account.

12. The method of claim 11, wherein the first item is purchased from a brick-and-mortar store or a web-based online store associated with the first account.

13. The method of claim 11, wherein the item category is a first item category, comprising:

detecting an indication of purchase of a third item; and identifying a fourth item in the online container, the fourth item and the third item belonging to a second item category.

14. The method of claim 13, comprising:

identifying an action selection rule associated with the second item category; and determining whether to remove the fourth item from the online container based on the action selection rule.

15. The method of claim 13, wherein the second item category is associated with collectible items, and wherein the second item category is not associated with a monetary threshold value configured for item removal.

16. The method of claim 13, comprising:

determining that the second item category is not associated with a monetary threshold value configured for item removal, the second item category being associated with collectible items;

receiving an indication from a third-party system confirming to remove the fourth item;

in response to receiving the indication from the third-party system confirming to remove the fourth item, removing the fourth item from the online container; and causing display of an indication of the fourth item being removed from the online container on the device associated with the second account.

17. The method of claim 11, comprising:

detecting an indication of purchase of a fifth item;

identifying a sixth item in the online container, the sixth item and the fifth item belonging to a third item category;

determining a user interest of the sixth item based on one or more shared characteristics between the fifth item and the sixth item; and determining that the sixth item is not to be removed from the online container based on the user interest.

18. The method of claim 17, comprising:

causing display of a selectable user interface element on the device, the selectable user interface element including an invitation to confirm the user interest in purchasing the sixth item.

19. The method of claim 17, wherein the user interest is determined further based on user attribute data indicating a user associated with the second account is a collector of items similar to the fifth item, and wherein the user attribute data comprises purchase history data, demographic data, occupational data, and behavioral data.

20. A non-transitory machine-readable storage medium having stored instructions that, when executed by one or more processors, cause the one or more processors to perform operations comprising:

identifying a first account based on an indication of purchase of a first item;

identifying a second account associated with the first account, the second account including an online container that includes a second item, the first item and the second item belonging to an item category;

determining that a purchase price of the second item exceeds a monetary threshold value configured for the item category;

in response to determining that the purchase price of the second item exceeds the monetary threshold value configured for the item category, removing the second item from the online container; and causing display of an indication of the second item being removed from the online container on a device associated with the second account.

* * * * *